United States Patent [19]

Lee

[11] Patent Number: 5,800,039
[45] Date of Patent: Sep. 1, 1998

[54] WARNING DEVICE FOR BICYCLE HAVING CHANGEABLE PATTERNS

[76] Inventor: Jen-Wang Lee, 7F., No. 768, Chung Cheng Rd., Chung Ho, Taipei Hsien, Taiwan

[21] Appl. No.: 883,897

[22] Filed: Jun. 27, 1997

[51] Int. Cl.⁶ .......................................... B62J 6/00
[52] U.S. Cl. .................... 362/72; 362/78; 362/251; 362/252; 362/800; 362/802; 340/432
[58] Field of Search ........................... 362/72, 78, 83.3, 362/234, 249, 251, 252, 276, 800, 802; 340/432

[56] References Cited

U.S. PATENT DOCUMENTS 5,121,305  6/1992  Deed et al. .................. 362/72
5,584,562  12/1996  Geran ........................ 362/72

*Primary Examiner*—Stephen F. Husar
*Attorney, Agent, or Firm*—Bacon & Thomas

[57] ABSTRACT

A warning device having changeable patterns for bicycle is provided. The operating of the warning device is controlled by a centrifugally controlled switch and a functional switch can be also controlled to provide a series of changeable patterns which are resulted from lighting on/off of a certain group of lighting devices. This resulted pattern can be enhanced by the transitional vision. The warning device includes a substrate, a centrifugally controlled switch, a housing, and a fastening device. By this provision of the warning device, a series of changeable warning patterns can be provided. As a result, both warning and entertaining effects can be attained.

11 Claims, 6 Drawing Sheets

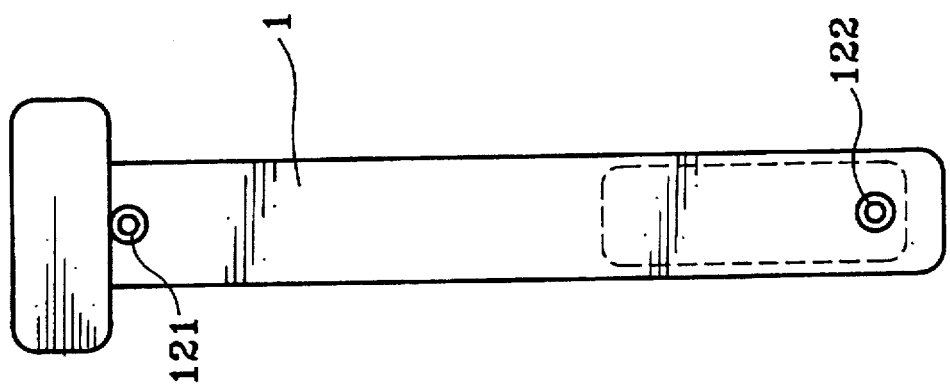
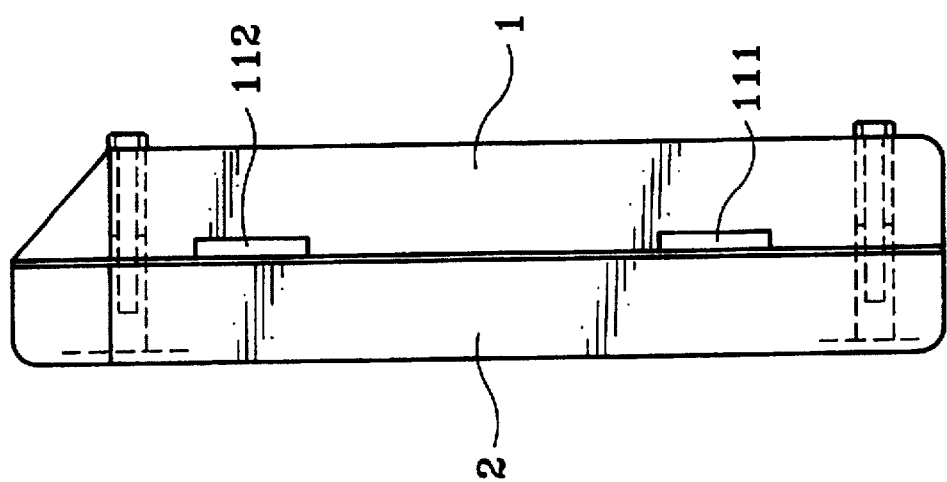

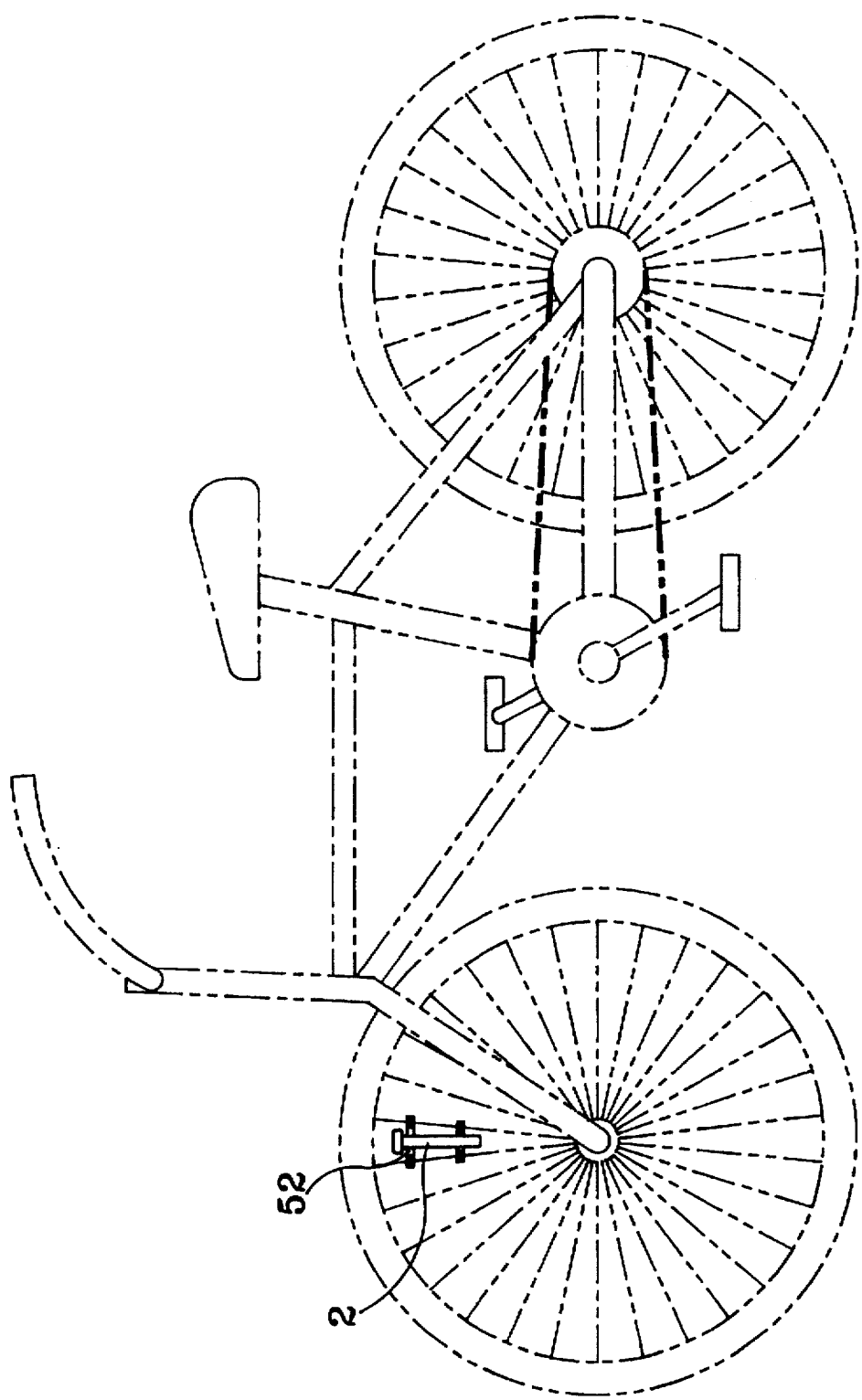

WARNING DEVICE FOR BICYCLE HAVING CHANGEABLE PATTERNS

FIELD OF THE INVENTION

The present invention relates to a warning device, more particularly, to a warning device for bicycle and wherein a plurality of special patterns can be generated continuously by those warning devices which are actuated to move by the centrifugal force from the rotating wheel and the transitional vision of human eyes. As a result, the bicycle can be readily spotted by a driver or passenger from a distance.

DESCRIPTION OF PRIOR ART

No matter in a developing or developed countries, bicycle has become both a transportation vehicle as well as sporting facility. In order to reduce the cost, normally, the bicycle is not equipped with lighting device. When riding on a street or road without street lamps, especially when the speed is comparatively higher, many an accidents have been occurred. On the other hand, fetal injuries have also tolled many a precious life. In order to provide a warning to a vehicle driver ahead, a light device which can be installed on the bicycle has been introduced. For example, a lighting device can be suitably installed at sides of the pedals. For example, this pedal is provided with a shaft and the peripheral of the pedal is installed with a plurality of light emitting means. The shaft of the pedal is installed with a magnetic field generating device and the pedal is provided with coils corresponding to the magnetic field generating device. Those light emitting means are electrically connected with the coils. When the pedal is rotated respect to the shaft, an induced current will be generated and those light emitting means will be lit.

Event the lighting pedal can attain its intended purpose to provide a warning to the driver or passenger far ahead, the lighting mode of this lighting pedal is fixed and is not changeable.

There is another safety warning device for bicycle has been disclosed. This warning device generally comprises a main housing which can be fixedly disposed between the spokes of the wheel. A power supply is disposed within the main housing and which includes a plurality of stationary coils and a magnetic core which is rotationally disposed within the coils. The magnetic core is connected with a shaft which extends over the main housing and is attached to a propeller disposed externally at the main housing. A battery cell is provided for back-up usage. A lighting emitting element is fixedly disposed within the groove of the main housing. When the wheel is rotated, the propeller is rotated by the wind generated by a rotating wheel, the shaft is rotated and in turn the magnetic core is rotated within the coils. As a result, an induced current will be generated to power on the light emitting element. Accordingly, during the riding of the bicycle, the light emitting elements will be lit to warn the driver or passenger far ahead. When the bicycle is stopped, the power from back-up battery may also keep the light emitting element on. Same to the above described embodiment, the light emitting elements fail to provide a changeable lighting pattern.

SUMMARY OF THE INVENTION

It is the objective of this invention to provide a warning device which comprises a substrate having a lighting devices array thereof. A centrifugally controlled switch is electrically connected to the substrate. A operating mode is stored within the memory. When the wheel is rotated as the bicycle is driving, the centrifugally controlled switch will be triggered on and the lighting devices array will be lit up according the operating mode stored in the memory. Those resulted pattern will be enhanced by the transitional vision and a changeable pattern is continuously attained.

The present invention can be concluded with the following advantages.

1. Since the resulted pattern can be enhanced by the transitional vision of our human being, an excellent warning effect can be attained especially during the night.

2. The pattern can be modified according to the actual requirements and an optimal effect can be attained.

3. If the bicycle is merely used a sporting equipment, the lighting devices may provide a further entertaining effect.

It is still the objective of this invention to provide a warning device having changeable patterns. The warning device is triggered on by a centrifugally controlled switch which can be readily switched on by the rotation of the wheel. In light of this, as long as the wheel is rotated, the warning devices are lit up and a warning effect can be attained.

BRIEF DESCRIPTION OF DRAWINGS

FIG. 2A is a right side elevational view of the warning device having changeable patterns for bicycle;

FIG. 2B is a rear view of the warning device having changeable patterns for bicycle;

FIG. 5 is a schematic illustration showing the installation of the warning device having changeable patterns for bicycle.

DETAILED DESCRIPTION OF PREFERRED EMBODIMENT

Figure 1:
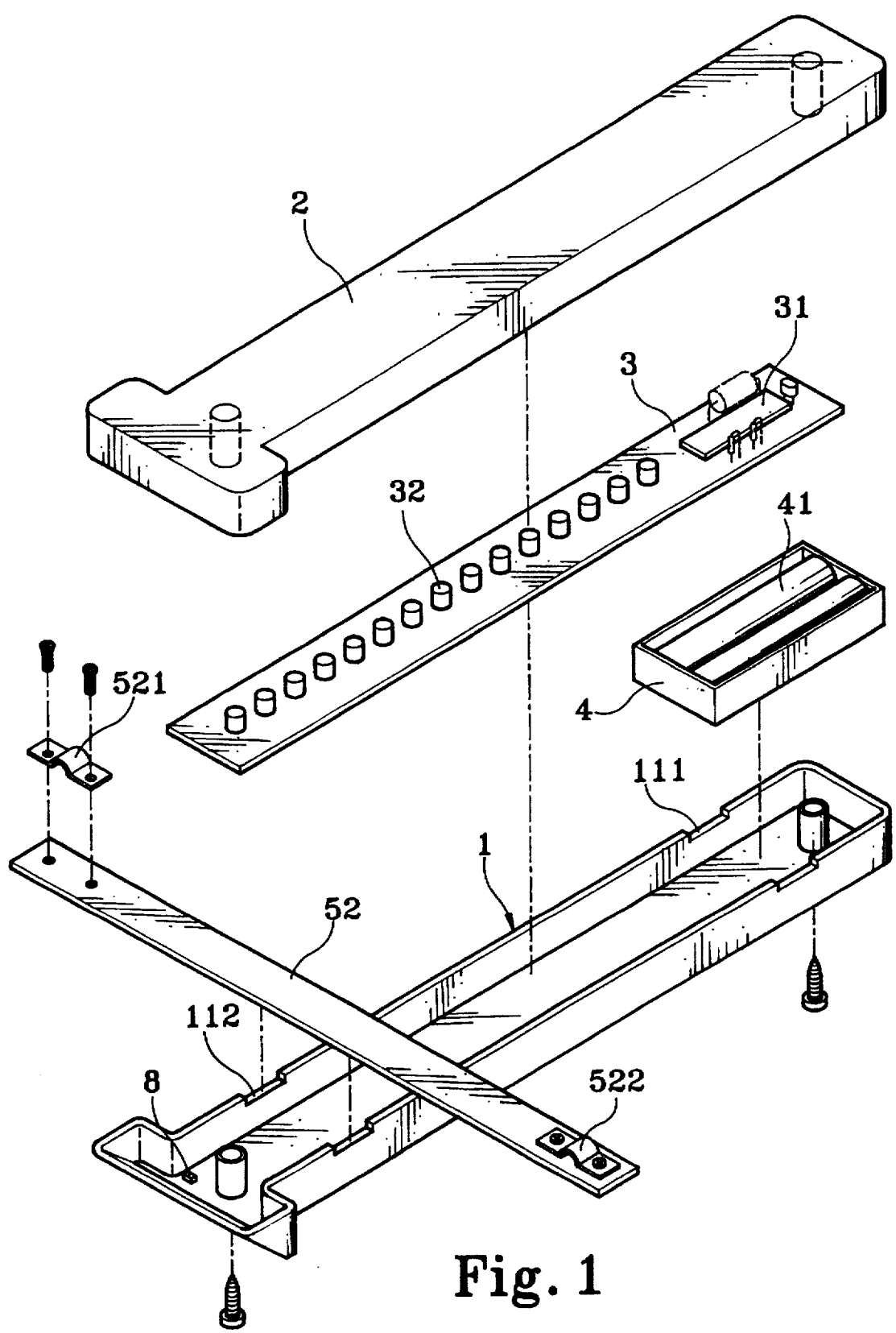
FIG. 1 is a perspective view of the warning device having changeable patterns for bicycle.

The warning device having changeable patterns for bicycle is installed on the spokes 61 of the wheels of the bicycle. The warning device generally comprises a substrate 3 having a plurality of lighting devices 32 thereof and which can be controlled to flash on or off such that a preset patterns can be therefore attained.

A battery cell 4 is provided and which is disposed adjacent to the substrate 3. The battery cell 4 is mounted a suitable number of batteries and the substrate 3 can be therefore powered.

A housing is provided to enclose the substrate 3 and the batteries 4. The housing is provided with at least two grooves 111, 112 at the suitable position.

A centrifugally controlled switch 8 is mounted at outside of the housing.

A fastening device 8 is used to attach the housing to the spoke 61 of the wheel of the bicycle.

When the wheel 6 is rotated, the lighting devices 32 is flashed on according to the preset design such hat a warning pattern is attained. Besides, the warning effect can be enhanced by the transitional vision of human being.

Figure 3:
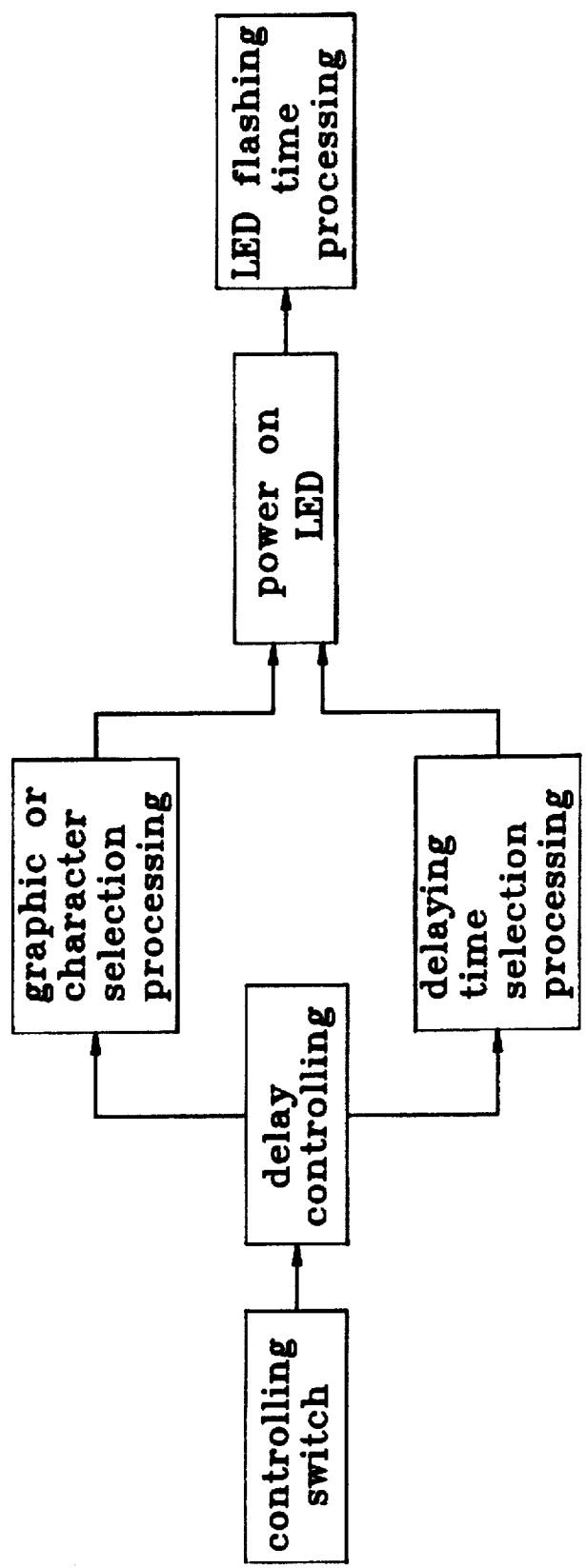
FIG. 3 is a block diagram of the circuitry of the warning device having changeable patterns for bicycle.

As described above, the substrate 3 has been provided with a plurality of lighting devices 32 which can be LEDs or bulbs. The circuitry is shown at FIG. 3 and is a conventional one. The upper housing 2 or lower housing 1 is provided with a power switch (not shown) in suitable position. The space beneath the substrate 3 and the lower housing 1 is installed with a battery cell 4 having battery 41 installed therein. As a result, the substrate 3 and the electronics mounted thereon can be powered. In an alternative, a battery apartment can be formed directly on the lower housing 1 and in which batteries are installed to power the substrate 3 and the accessories.

The integrated circuit 31 is formed on the printed circuit. When the power switch is on, those lighting devices 32 can be lit up such that a certain numbers of lighting devices 32 can be lit and a special pattern can be therefore attained continuously. This result can be controlled by means of memory. When a functional switch is depressed, another special patterns can be generated by lighting up of another group of lighting devices 32. As a result, the original pattern an be suitably replaced by the second pattern. By the actuation of the functional switch, different signal can be generated, as a result, different pattern can be continuously attained. When the signal is sent, the first pattern will be switched off, after a few seconds, the second pattern will be switched on. Then the second pattern will be off and a few second later, a third pattern will be generated. The process will be repeatedly proceeded.

Figure 2C:
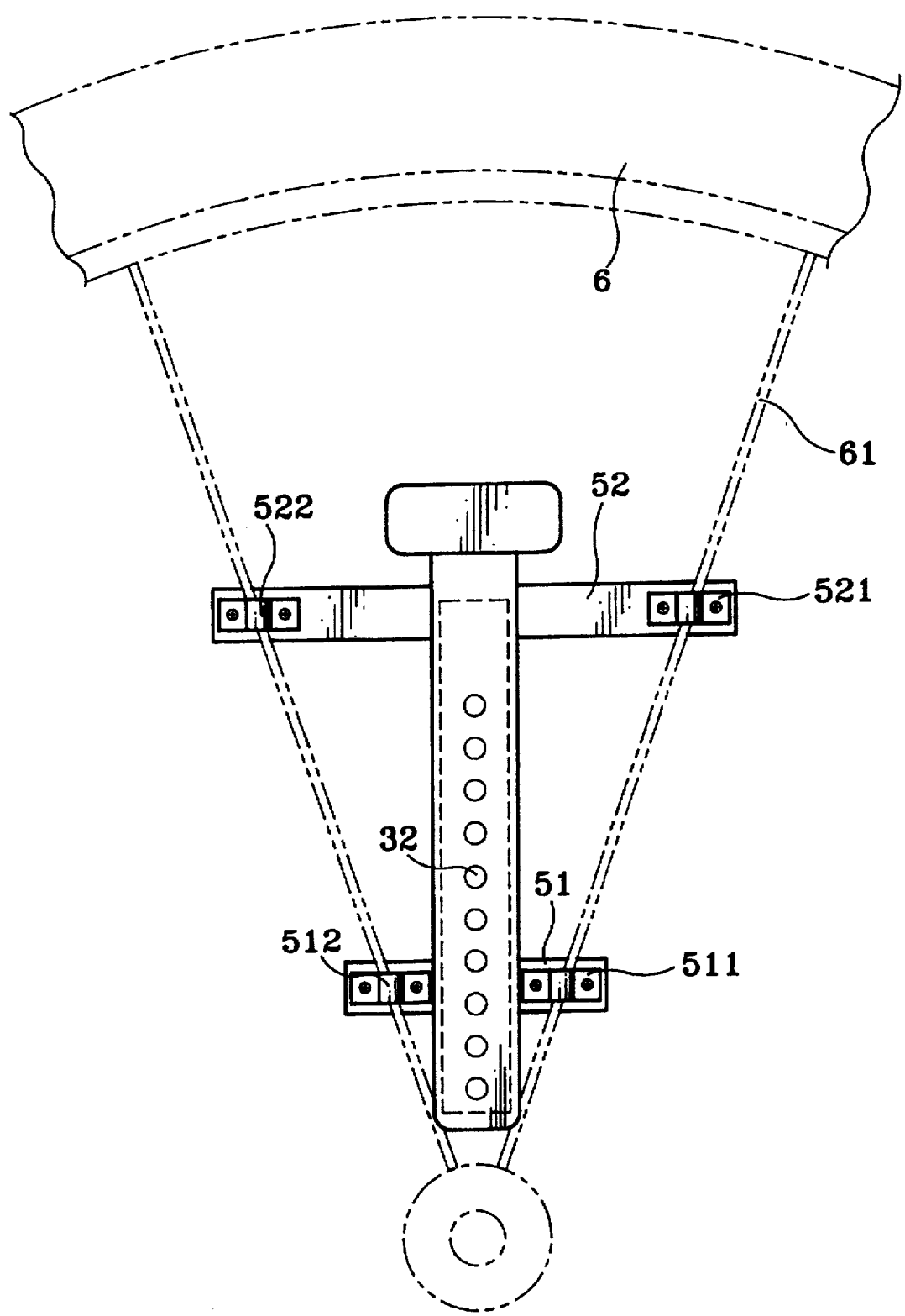
FIG. 2C is a front view of the warning device having changeable patterns for bicycle.

In assembly, the upper housing 2 and the lower housing 1 can be locked together by means of screws which pass through the threaded holes 121, 122. In an alternative, the upper and lower housings 2, 1 can be connected to each other by clipping tabs or other suitable means which is pertinent to the skilled in the art. When the warning device is assembled, it is clearly shown in FIGS. 2A and 2B. As the warning device is installed to the spoke 61 of the wheel 6, the supporting plates 51, 52 are passed through the grooves 111, 112 respectively and then the supporting plates 51, 52 are fixedly attach to the warning device by means of screws or other suitable fastening devices. Then the supporting plates 51, 52 can be attached to the spokes 61 by means of fixing plates 511, 512, 521, and 522. When this installation is completed, the overall shape is shown in FIGS. 2C and 5.

The centrifugally controlled switch 8 can be a mercury switch, or ball-type switch which can be closed or opened by the movement of a ball installed therein or another type of switch by which the lighting devices 32 can be lit up as the integrated circuit 31 is triggered. When the switch 8 is closed, the integrated circuit 31 is powered on and those lighting devices 32 will be lit up according the preset modes which is stored in the memory. Consequently, a plurality of changeable patterns can be attained. When the wheel 6 is rotated, the centrifugal switch 8 is triggered on and the lighting devices 32 are lit, a certain type of pattern established by the lighting devices 32 can be seen. When the wheel 6 stopped to rotate, the centrifugal switch 8 is opened, the power to the substrate 3 is off and the lighting devices 32 are also off.

Since the warning device is controlled by the centrifugally controlled switch 8 which is triggered by the rotation of the wheel 6 because a centrifugal force can be generated during the rotation of the wheel. When the wheel 6 keeps on rotating, the lighting devices 32 is continuously lit up according to the preset modes stored in the memory. Consequently, a plurality of patterns are continuously generated and each of the patterns can be readily and clearly spotted by the driver or other passengers. Because of transitional vision of our human being, a warning messages or patterns can be therefore generated, such a "S-T-O-P" or other traffic warning sign. When the wheel stops, the lighting devices 32 are off as the power is interrupted and the patterns are also disappeared.

Figure 4:
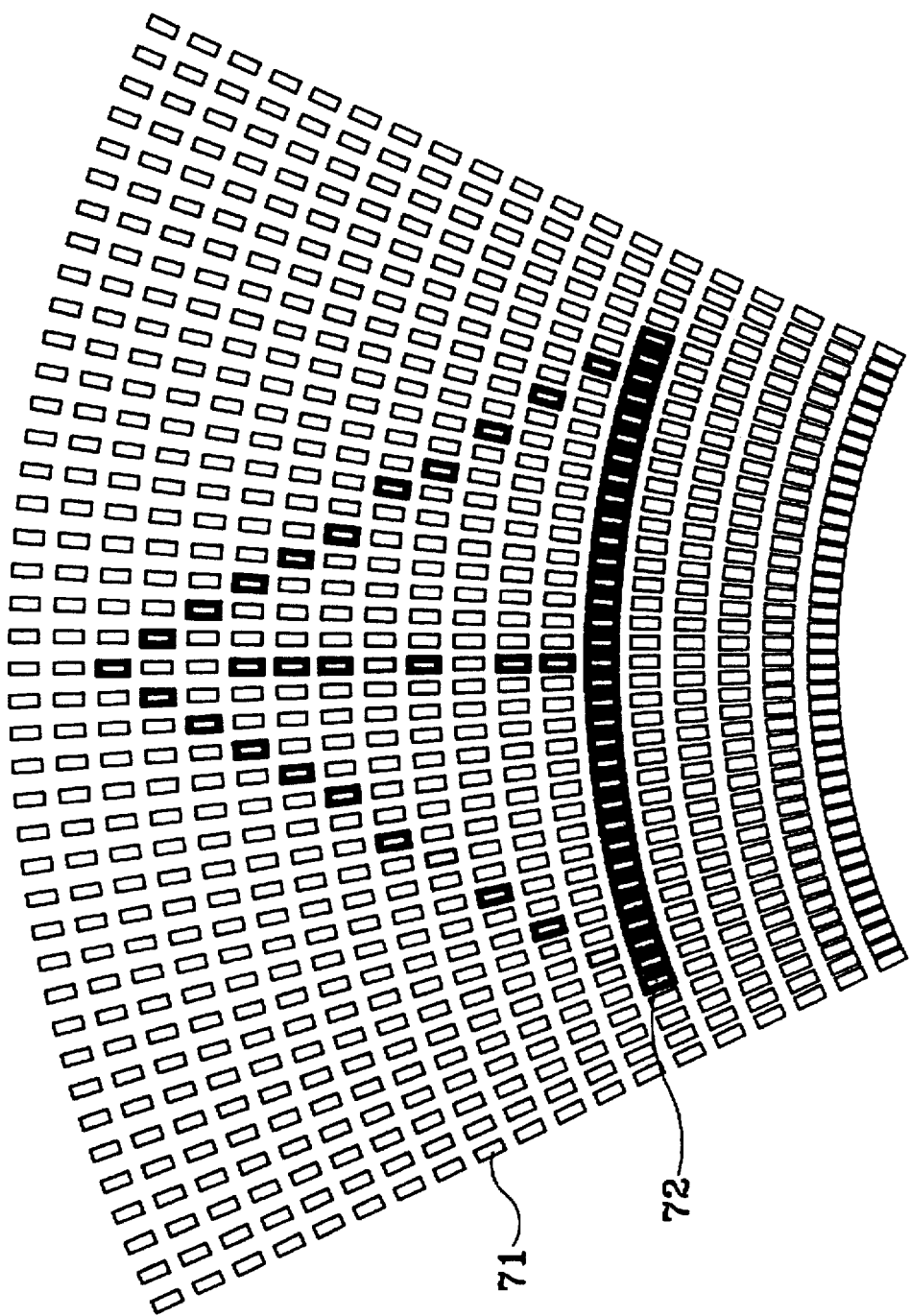
FIG. 4 is a schematic illustration showing a pattern established the flash on/off of the warning device.

As shown in FIG. 4, a pattern generated by the lighting devices 32 is shown. When the wheel 6 is rotated, a sectional sector area is generated by the lighting devices 32. Within few seconds, the white block 71 means the lighting device 32 is off and the black block 72 means the lighting device 32 is on. When the wheel keeps on rotating, a traffic sign is generated on those black blocks 72. In fact, the pattern can be readily modified or designed to meet different requirement or provide different attracting effect.

I claim:

1. A warning device for bicycle having changeable patterns of the type which can be readily installed onto the spoke of the wheel of the bicycle such that a changeable warning pattern can be generated, said warning device comprising:

a substrate having a plurality of lighting devices disposed thereon, wherein in a group of lighting devices can be lit on such that a preset pattern can be attained;

a housing for enclosing said substrate therein, said housing being configured by an upper and lower housings, at lease two grooves being formed at said housing at suitable position;

a centrifugally controlled switch being disposed within said housing; and a fastening device for attaching said housing to the spoke of the wheel;

wherein when said wheel is rotated, said centrifugally controlled switch can be triggered on to power said substrate, consequently, a certain group of lighting devices are lit up according to preset modes stored in the memory, a warning pattern is therefore spotted through the transitional vision of our human being.

2. A warning device for bicycle as recited in claim 1, wherein said substrate includes a plurality of lighting devices and an integrated circuit, wherein when the wheel of the bicycle is rotated, said centrifugal controlled switch is closed such that a certain group of lighting devices are lit on to display a certain warning pattern.

3. A warning device for bicycle as recited in claim 1, wherein said housing being configured by an upper housing and a lower housing.

4. A warning device for bicycle as recited in claim 3, wherein said upper housing has a T-shape configuration and is made from transparent material.

5. A warning device for bicycle as recited in claim 3, wherein said lower housing has a T-shape configuration.

6. A warning device for bicycle as recited in claim 3, wherein said upper and lower housings are assembled together by means of screw members.

7. A warning device for bicycle as recited in claim 3, wherein said upper and lower housings are fastened together by means of clipping tabs.

8. A warning device for bicycle as recited in claim 3, wherein said upper and lower housings are locked up together.

9. A warning device for bicycle as recited in claim 3, wherein said fastening device includes at least two supporting plates and four fixing plates, said supporting plates are passed through said grooves of said housing and are attached to the spokes by means of said fixing plates via screwing, welding or adhering.

10. A warning device for bicycle as recited in claim 1, wherein said housing being provided with a functional switch at suitable position, when said functional switch is depressed, a first certain warning pattern is generated, after that, a second and third warning patterns will be generated consecutively and repeatedly.

11. A warning device for bicycle as recited in claim 1, wherein said housing is provided with a battery cell which is adjacent to the substrate, said batter cell is installed with batteries for powering said substrate.

* * * * *